(12) United States Patent
Vincent et al.

(10) Patent No.: US 12,168,154 B2
(45) Date of Patent: Dec. 17, 2024

(54) SYSTEM FOR EXTINGUISHING A FIRE AND / OR PREVENTING A FIRE FROM STARTING OR RESTARTING IN AN ELECTRIC VEHICLE, ASSOCIATED METHOD OF OPERATION COMPRISING A PRIOR STEP OF LIFTING THE VEHICLE OFF THE GROUND

(71) Applicant: COMMISSARIAT A L'ENERGIE ATOMIQUE ET AUX ENERGIES ALTERNATIVES, Paris (FR)

(72) Inventors: Rémi Vincent, Grenoble (FR); Gilles Icart, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 2 days.

(21) Appl. No.: 17/453,232

(22) Filed: Nov. 2, 2021

(65) Prior Publication Data

US 2022/0134154 A1 May 5, 2022

(30) Foreign Application Priority Data

Nov. 2, 2020 (FR) ..................................... 20 11227

(51) Int. Cl.
*A62C 3/07* (2006.01)
*A62C 3/16* (2006.01)
*B66F 3/40* (2006.01)

(52) U.S. Cl.
CPC .................. *A62C 3/07* (2013.01); *A62C 3/16* (2013.01); *B66F 3/40* (2013.01)

(58) Field of Classification Search
CPC ....... B60R 2021/138; A62C 2/06; A62C 3/00; A62C 99/009; A62C 3/07; A62C 3/16; B60F 3/40
See application file for complete search history.

(56) References Cited

U.S. PATENT DOCUMENTS

| 4,605,586 A | * | 8/1986 | Lane | ........................ D06N 7/00 428/920 |
| 2019/0290945 A1 | * | 9/2019 | Raymond | ............ A62C 3/0292 |

FOREIGN PATENT DOCUMENTS

| CA | 2633852 A1 | * | 5/2007 | ............... A62C 2/06 |
| CN | 108553773 | * | 9/2018 | ............... A62C 3/16 |

(Continued)

OTHER PUBLICATIONS

French Preliminary Search Report issued Jun. 8, 2021 in French Application 20 11227 filed on Nov. 2, 2020, 3 pages (with English Translation of Categories of Cited Documents).

*Primary Examiner* — Christopher R Dandridge

(74) *Attorney, Agent, or Firm* — Oblon, McClelland, Maier & Neustadt, L.L.P.

(57) ABSTRACT

A system for extinguishing a fire and/or preventing a fire from starting or restarting in an electric vehicle having a module or a battery pack with a plurality of electrochemical batteries, in particular metal-ion batteries, includes a self-supporting inflatable structure, the shape and dimensions of which when deployed are configured to lift the electric vehicle off the ground, create a liner between the ground and the electric vehicle, and create a peripheral barrier in continuity with the liner, which is closed upon itself, around the electric vehicle. The system also includes a liquid supply device for filling, at least partially, the sealed volume delimited inside the peripheral barrier and by the liner, so as to immerse at least the module or battery pack in the liquid.

19 Claims, 3 Drawing Sheets

(56) References Cited

FOREIGN PATENT DOCUMENTS

| | | | | |
|---|---|---|---|---|
| CN | 108553773 A | 9/2018 | | |
| DE | 10 2013 105 416 B3 | 9/2014 | | |
| DE | 102013105416 * | 9/2014 | ............. | F24D 5/045 |
| DE | 20 2019 002 829 U1 | 8/2019 | | |
| DE | 202019002829 * | 8/2019 | ............... | A62C 3/07 |
| DE | 102019003289 A1 * | 1/2020 | ............... | A62C 3/16 |
| DE | 102020111287 A1 * | 1/2021 | ............... | A62C 3/07 |

\* cited by examiner

SYSTEM FOR EXTINGUISHING A FIRE AND / OR PREVENTING A FIRE FROM STARTING OR RESTARTING IN AN ELECTRIC VEHICLE, ASSOCIATED METHOD OF OPERATION COMPRISING A PRIOR STEP OF LIFTING THE VEHICLE OFF THE GROUND

TECHNICAL FIELD

The present invention relates to the field of electric vehicles.

The main aim of the invention is to extinguish a fire and/or prevent a fire from restarting in an electric vehicle including a module or a battery pack with several electrochemical batteries, more particularly metal-ion batteries. Use of the invention preventatively, to reduce the risk of a fire starting in an electric vehicle, in particular accidentally, is also possible.

Although described with reference to a lithium-ion battery, the invention also applies to any metal-ion electrochemical battery, i.e. also to sodium-ion, magnesium-ion, aluminum-ion, etc. batteries, or more generally to any electrochemical battery.

In this document and in the context of the invention, "electric vehicle" means any motor vehicle with electric or hybrid propulsion, including at least one module or battery pack with several electrochemical batteries, more particularly metal-ion batteries.

PRIOR ART

In the development and manufacture of lithium-ion batteries, for each new request/profile, whichever market operators are involved, precise specifications are necessary (series/parallel electrical, mechanical, thermal, etc. architectures) to ensure optimal design of a high-performance, safe battery pack.

In particular, consideration must be given to the safety of lithium-ion batteries at all levels, whether battery alone, module or battery pack.

Various passive or active safety devices may also be included in a cell (battery), and/or a module and/or a battery pack to prevent problems, when the battery malfunctions or a cell fails.

A lithium electrochemical system, whether at the level of the cell (battery), module or pack, produces exothermic reactions whatever the cycling profile in question. Thus, in the case of a single battery, depending on the chemistry involved, optimal operation of lithium-ion batteries is limited within a given temperature range.

An electrochemical battery must operate within a defined temperature range, typically generally below 70° C. on the external surface of the housing, so as not to impair performance, or indeed to prevent physical damage or even destruction.

Examples include lithium iron phosphate batteries which have an operating range generally between −20° C. and +60° C. Above 60° C., the materials can suffer considerable damage, impairing the performance of the cell. Above a temperature referred to as the thermal runaway temperature, which may be between 70° C. and 110° C., exothermic internal chemical reactions are triggered. When the battery is no longer capable of discharging heat sufficiently, the temperature of the cell increases until it is destroyed, this usually being referred to as thermal runaway.

In other words, thermal runaway occurs in a cell (battery) when the energy given off by the exothermic reactions happening inside the cell exceeds its capacity to dissipate this energy. Thermal runaway may be followed by the generation of gas and explosion and/or fire.

There have already been a number of cases of fires in electric vehicles including a battery, or battery pack with several lithium-ion batteries, which have proved particularly difficult to bring under control.

This is mainly due to the fire restarting, sometimes several hours after it was extinguished.

For example, take the recent case of an electric vehicle which caught fire in a garage. The fire was put out by fire fighters. Around 4.5 hours later, the fire started again when the vehicle was being loaded onto the recovery vehicle.

A fire starting or restarting is generally caused by components of the battery (modules or batteries (cells)) which have been electrically disconnected but still contain charge. Thus, randomly, for example when the damaged vehicle is moved, these components can produce electrical arcs that can start another fire.

To avoid such a situation, it is necessary to find a solution that ensures, when or after the fire is extinguished, or even preventatively, that the module or battery pack of an electric vehicle is fully electrically discharged.

The aim of the invention is to at least partly meet this need.

DESCRIPTION OF THE INVENTION

To this end, the invention relates, according to one aspect, to a system for extinguishing a fire and/or preventing a fire from restarting in an electric vehicle including a module or a battery pack comprising a plurality of electrochemical batteries, in particular metal-ion batteries, comprising:

a self-supporting inflatable structure, the shape and dimensions of which when deployed are adapted to lift the electric vehicle off the ground, create a liner between the ground and the electric vehicle, and create a peripheral barrier in continuity with the liner, which is closed upon itself, around the electric vehicle;

a liquid supply device for filling, at least partially, the sealed volume delimited inside the peripheral barrier and by the liner, so as to immerse at least the module or battery pack in the liquid.

According to one advantageous variant embodiment, the structure may be inflated with liquid at least partially and to this end it comprises at least one filling hole for filling with liquid so as to inflate at least the part of the structure adapted to lift the vehicle and the part adapted to create the peripheral barrier.

Advantageously, the filling hole is adapted to be connected to the liquid supply device.

According to one advantageous embodiment, the inflatable structure comprises at least one lifting cushion which deploys vertically under the vehicle as it inflates, so as to lift the vehicle. A plurality of cushions that can be inflated with water, preferably pressurized water coming directly from an emergency response vehicle such as a fire truck, may be provided. As an alternative to water, compressed air may be used to inflate the cushion or cushions.

According to one advantageous variant embodiment, the inflatable structure further comprises a flexible strip extending from the bottom of the cushions and deploying when it is inflated under the lifted electric vehicle toward the periphery thereof, so as to create the liner.

According to another advantageous embodiment, the inflatable structure further comprises at least one flexible casing, which is closed upon itself, in the form of a sausage in continuity with the liner, and which deploys from the liner during inflation to create the peripheral barrier.

According to a first embodiment, the inflatable structure comprises a plurality of sausages, fluidly interconnected at the bottom, and extending vertically when deployed.

Advantageously, the vertical sausages are spaced apart regularly, so as to ensure uniform inflation and hence a uniform barrier around the whole periphery thereof.

According to a second embodiment, the inflatable structure comprises one or a plurality of annular sausages each extending along at least a horizontal circumference when they are deployed.

According to this second embodiment, and an advantageous variant, the inflatable structure comprises a single annular sausage which is adapted, when the sealed volume is filled, to partially lift the liner so as to create the peripheral barrier together with the annular sausage. This variant is simple to implement with a single horizontal annular sausage that will float, in a way, and cause the liner to rise up the sides of the vehicle as the sealed volume is filled.

According to a particularly advantageous variant, at least some of the sausages comprise an outlet hole at the top, such that when they are deployed vertically, after being inflated with the liquid, this liquid fills, by overflowing from the sausages, the sealed volume delimited inside the barrier and by the liner.

The liquid for filling the sealed volume is advantageously water.

In this case, the system advantageously comprises salts that are soluble in water, placed beforehand in at least one area of the structure in the non-deployed state so that said salts are in contact with the water when the sealed volume (R) is filled.

Preferably, the inflatable structure is at least partially made of a fabric based on aramid fibers. Such a fabric is particularly suitable for making the structure flame-resistant, when it is installed.

Also preferably, the fabric is sealed, at least on the inside intended to be in contact with the liquid, by a polytetrafluoroethylene (PTFE) film.

The liquid supply device is advantageously a fire-fighting vehicle, in particular a tank truck, an emergency response vehicle. Thus, fire fighters responding to a fire in an electric vehicle have a completely autonomous system, as the inflatable structure can easily be loaded on board a vehicle and thus deployed very quickly on site.

The invention also relates to a method of operation of a system just described, comprising the following steps:
  i/ positioning the inflatable structure under the electric vehicle;
  ii/ inflating a first part of the structure under the electric vehicle so as to lift the vehicle;
  iii/ inflating a second part of the structure so that it deploys under the lifted electric vehicle, toward the periphery of the latter so as to create the liner;
  iv/ once the liner has deployed, inflating a third part of the structure so as to create the peripheral barrier around an electric vehicle;
  v/ filling, with a liquid from the supply device, at least part of the sealed volume delimited inside the peripheral barrier and by the liner, so as to immerse at least the module or battery pack.

Optionally, once step iii/ of deployment of the liner has been carried out, the first part of the structure may be deflated such that the vehicle rests on the ground with the liner in between.

According to one advantageous embodiment, steps ii/ to v/ are carried out one after the other using just the supply device, step v/ being carried out by overflowing from the sausages constituting the third part of the structure once they have been inflated.

Advantageously, use is made of water, optionally containing salts, as inflation and filling liquid for both steps iv/ and v/. Salts advantageously increase the conductivity of the water and thus ensure electrical discharge of the module or battery pack once immersed. To simplify the work of the emergency responders called to a fire, specifically the fire fighters, the salts may be contained directly in the inflatable structure, in particular the sausages, allowing, in the configuration in which water is used for inflation and then for filing the immersion volume, efficient dilution when the water is added.

According to one advantageous variant, steps iii/ to v/ are carried out simply by continuous inflation, using liquid, of the second and third parts of the structure, which are fluidly interconnected.

Alternatively, steps iii/ and iv/ are carried out simply by continuous inflation, using air or another gas, of the second and third parts of the structure, which are fluidly interconnected. The third part of the structure may also act as the second part of the structure.

Thus, the invention consists essentially of a system that extinguishes a fire in an electric vehicle and prevents any fire from starting or restarting by means of a self-supporting inflatable structure which, when inflated and closed upon itself, forms a barrier both peripherally around the vehicle and a liner under the vehicle, with the sealed internal volume delimited therein immersed in a liquid, ensuring that the fire is controlled and the module or battery pack of the vehicle is electrically discharged.

The inflatable flexible structure allows the emergency responders, specifically the fire fighters, to avoid having to bring rigid retention containers, which are particularly bulky and require means for lifting the vehicle.

This structure becomes self-supporting when inflated, and is advantageously inflated using the same liquid from the supply device, which may fill the volume delimited by the barrier by overflowing from the structure deployed.

Some of the many advantages of the invention are:
  a system which is simple, easy and quick to implement around an electric vehicle on fire;
  an inflatable structure that can be loaded on board quickly and deployed quickly and easily from an emergency response vehicle, such as a tank truck or fire truck;
  guaranteed extinction of the fire and prevention of the fire restarting owing to electrical discharge by virtue of the immersion of the module or battery pack of the electric vehicle;
  possible recovery of all the liquid, which may contain particles coming from the vehicle, which is contained in the sealed volume delimited by the peripheral barrier and the liner.

Further advantages and features of the invention will emerge more clearly on reading the detailed description of embodiments of the invention, provided by way of non-limiting illustration with reference to the following figures.

DETAILED DESCRIPTION

Figure 1A:
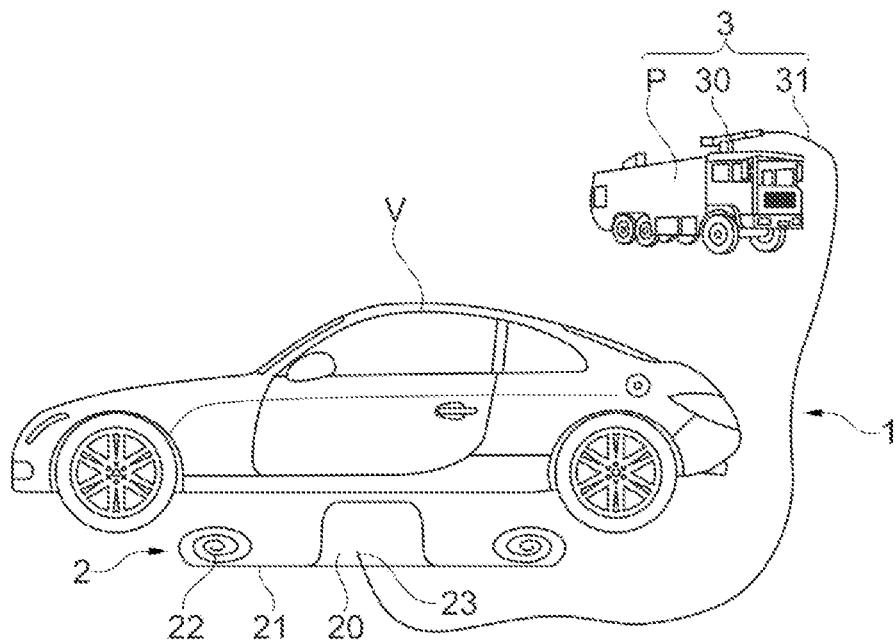
FIG. 1A is a schematic perspective view in cross section of a first step of operation of a system for extinguishing a fire and preventing the fire from restarting according to the invention, which consists in placing the inflatable structure of the system under an electric vehicle.

The terms "lower", "upper", "top" and "bottom" are to be understood with reference to a self-supporting structure in the inflated and installed configuration, extending vertically and creating a peripheral barrier that is closed upon itself.

FIGS. 1A and 1B to 3 show a system 1 according to the invention for extinguishing a fire in an electric vehicle and preventing any fire from starting or restarting in this vehicle.

The system 1 comprises a self-supporting structure 2 made up of one or more lifting cushions 20, a flexible strip 21 which extends from the bottom of the cushions and is intended to form a liner under the electric vehicle, and a plurality of aligned flexible casings, each closed upon itself, in the form of sausages 22 in continuity with the liner, the sausages being fluidly interconnected at the bottom.

The sausages 22 are spaced apart regularly, so as to ensure uniform inflation. The lifting cushions(s) 20, the liner 21 and the sausages 22 are advantageously made of a fabric based on aramid fibers and coated, at least on the inside intended to face the vehicle V, with a polytetrafluoroethylene (PTFE) film.

Figure 1B:
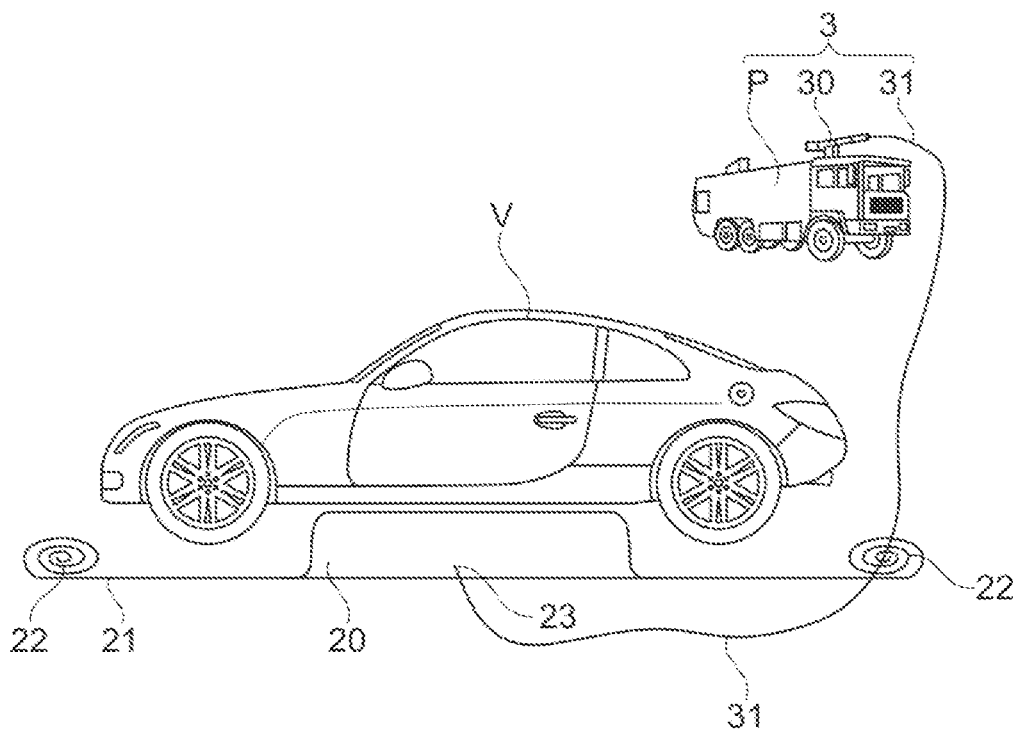
FIG. 1B is a schematic perspective view in cross section of a second step, which comes directly after the first step, and which consists in inflating the structure to lift the electric vehicle and deploying the structure underneath to create a liner.
Figure 2:
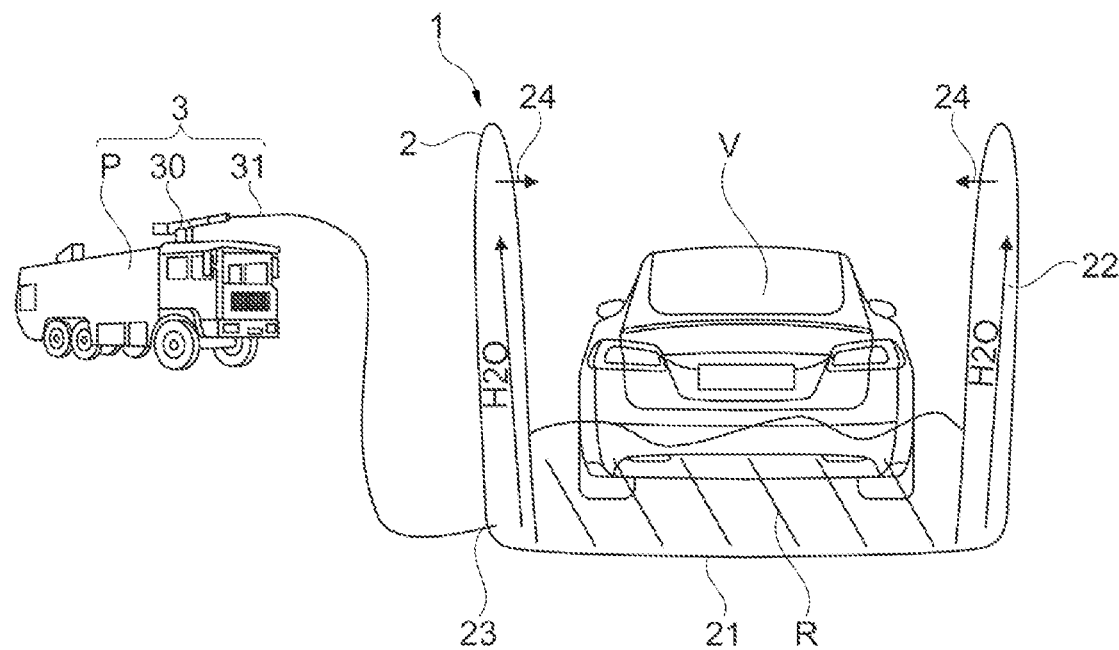
FIG. 2 is a schematic perspective view in cross section of a system for extinguishing a fire and preventing the fire from restarting according to a first embodiment of the invention, in the configuration installed around and under an electric vehicle, with a connection to a fire truck that serves as device for supplying water for immersing at least the battery pack of the vehicle.
Figure 3:
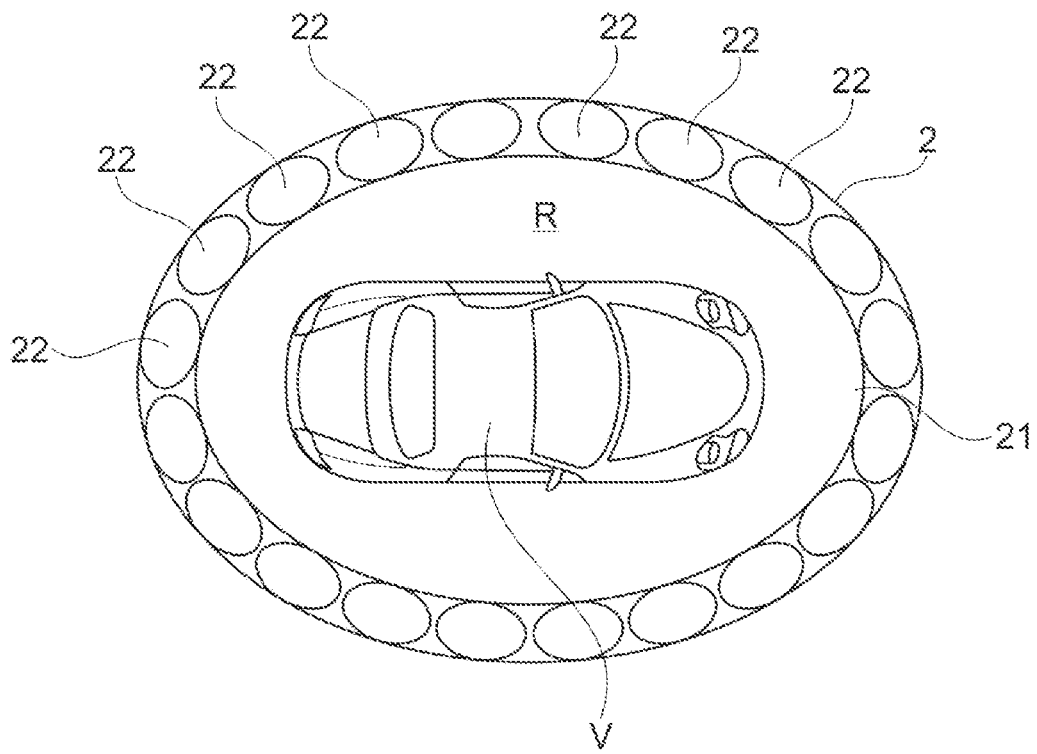
FIG. 3 is a view from above showing the self-supporting structure of a system according to the invention shown in FIG. 2, in the configuration installed around and under an electric vehicle.

At least some of the sausages 22 comprise, at the bottom, a supply hole 23 which is connected to a water supply device 3. As shown in FIGS. 1A, 1B and 2, this supply device 3 may be a fire truck P connected to the supply hole 23 from the deluge gun 30 via a special hose 31.

At least some of the sausages 22 also comprise, at the top, an outlet hole 24.

The system works as follows.

Step i/: An emergency responder, in particular a fire fighter, positions the inflatable structure 2 with lifting cushions 20 under an electric vehicle V which is on fire or in which a fire has just been put out.

Step ii/: once the water supply device 3 has been connected to the supply hole 23 of the lifting cushions 20, the latter are filled with water.

This lifts the vehicle, in the case of a car by around a few centimeters (FIG. 1A).

Step iii/: once the vehicle has been lifted, the flexible strip 21, which is preferably coiled, is inflated so that it deploys under the lifted electric vehicle V and toward the periphery of the latter so as to create the liner. Such inflation may be performed simply by actuating a valve in the system without having to disconnect the water supply device 3. By virtue of the water pressure, the flexible strip 21 uncoils and passes under the wheels of the lifted vehicle V (FIG. 1B).

Step iv/: once the liner has been deployed, the sausages 22 are inflated, and they deploy vertically and make the structure 2 self-supporting while creating a peripheral barrier around the vehicle V, which delimits a sealed internal volume or sealed tank R. Such inflation may also be performed simply by actuating a valve in the system without having to disconnect the water supply device 3.

Step v/: When the water reaches the outlet hole(s) 24, it overflows from the sausages 22 into the tank R. As the tank R is also sealed, specifically by virtue of the liner 21, it thus fills with water.

The sealed tank R is filled until at least the module or battery pack fitted inside the vehicle V is immersed.

Such immersion ensures without fail the electrical discharge of the module or battery pack of the vehicle V, thereby preventing any fire from restarting.

According to a second embodiment, the inflatable structure according to the invention may be made up of one or more annular sausages 22 which, once inflated, each extend along a horizontal circumference around the vehicle.

Figure 4:
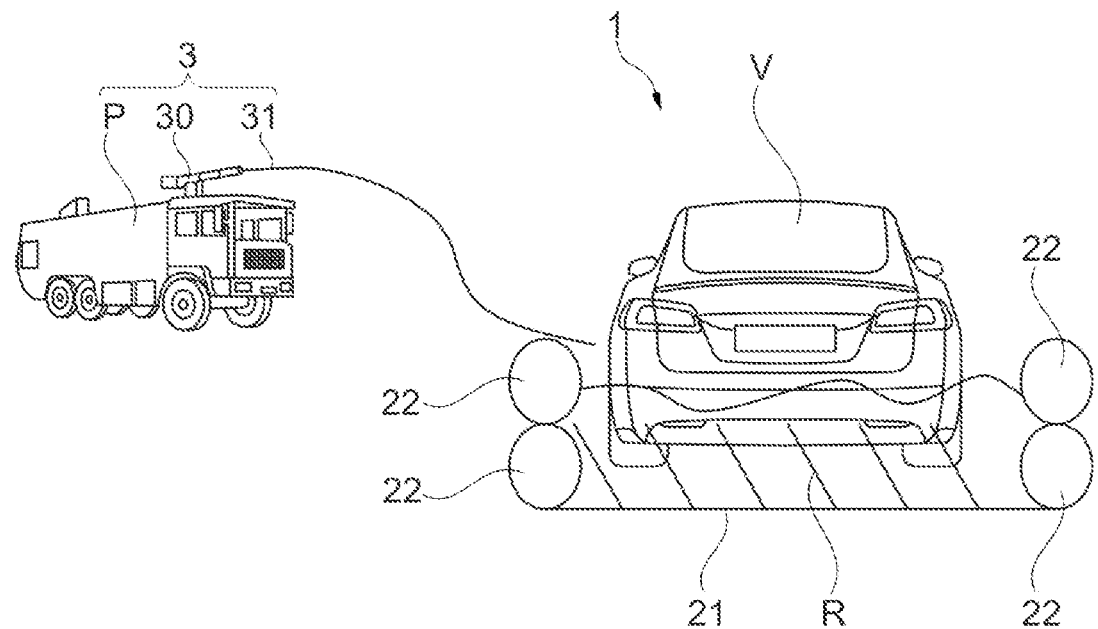
FIG. 4 is a schematic perspective view in cross section of a system for extinguishing a fire and preventing the fire from restarting according to a second embodiment of the invention, in the configuration installed around and under an electric vehicle, with a connection to a fire truck that serves as device for supplying water for immersing at least the battery pack of the vehicle.

In the case of a plurality of sausages, these are advantageously superposed and fluidly interconnected so that they are in communication during inflation. This configuration is shown in FIG. 4.

Figure 5:
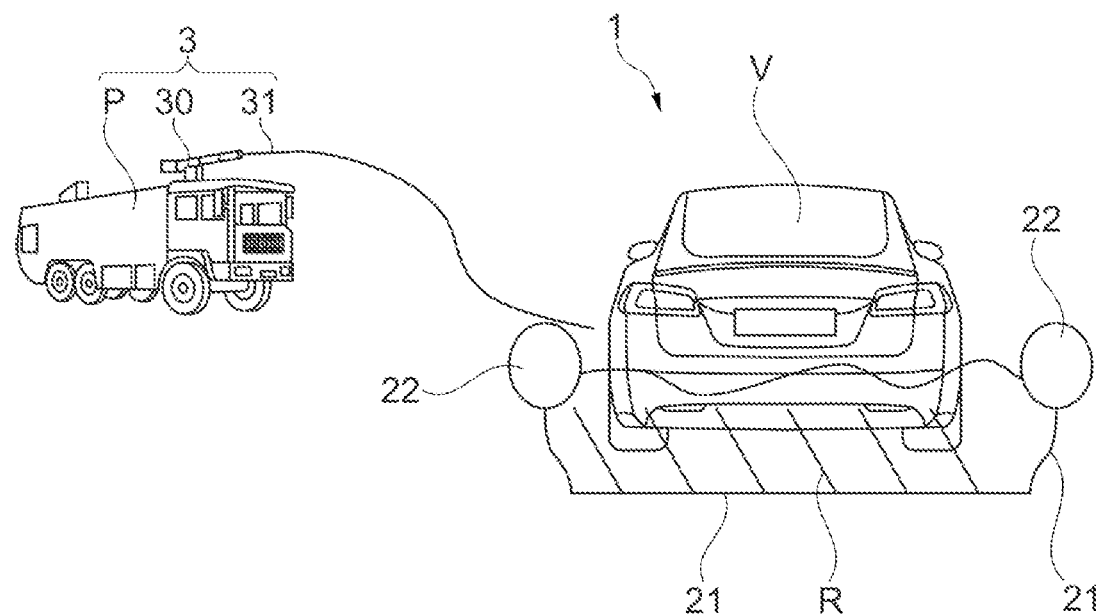
FIG. 5 is a schematic perspective view in cross section of a system for extinguishing a fire and preventing the fire from restarting according to a variant of the second embodiment of the invention, in the configuration installed around and under an electric vehicle, with a connection to a fire truck that serves as device for supplying water for immersing at least the battery pack of the vehicle.

A variant with a single horizontal annular sausage 22 is shown in FIG. 5.

The single sausage (FIG. 5) or the stack of sausages (FIG. 4) encloses the tank R peripherally. This configuration has the advantage of facilitating a simultaneous step of deployment of the liner during inflation of the sausage(s), especially if the latter are inflated using air. In other words, it is the pressurization of the sausage(s), in particular the bottom one, that helps deploy the liner. This embodiment has the added advantage of saving weight.

According to a variant of the second embodiment, as shown in FIG. 5, the single horizontal annular sausage 22 is inflated using a fluid which has a density that is notably less than the liquid used to fill the tank R. Preferably, this sausage 22 is inflated using compressed air. This sausage 22 initially rests on the ground after it has been inflated, said inflation also causing deployment of the liner by outward traction. When the tank R is filled with the liquid, the difference in density between the fluid contained in the sausage and the filling liquid causes the sausage to be raised by floating with the level of liquid, thereby also lifting the liner around its periphery, to create a peripheral wall around the vehicle having a notable vertical component. The combination of the single annular sausage 22 and the substantially vertical part of the liner 21 in this case plays the role of barrier for peripherally enclosing the tank R. This configuration has the advantage of reducing the amount of material necessary for the inflatable structure, and hence its overall volume when collapsed. Consequently, the inflatable structure is easier to transport and handle.

Soluble salts may be placed in the system. Once these salts have been dissolved by the water supplied, they promote more efficient and quicker discharge of the module or battery pack. They may be solid NaCl salts, for example.

These salts may be added to the tank R by the users, for example the fire fighters, once the inflatable structure has been put in place and before or during filling thereof. To avoid this addition step and thus simplify the emergency response operation, these salts may also be already present in solid form in the collapsed structure, before it is deployed and inflated; for example they may be placed in the liner or on the outer face of the sausages forming part of the space R and in contact with the filling water. If the tank is filled with water by overflow from the peripheral sausages 22, the salts may be placed directly inside the sausages 22. In this case, the salts are dissolved as the sausages are filled with water, this solution then spilling into the tank R through the upper openings 24 in the sausages.

Further variants and improvements may be envisaged without exceeding the scope of the invention.

For example, if, in all the examples shown, the self-supporting inflatable structure is made up of a plurality of sausages inflated using water for immersing the battery pack of the electric vehicle, any other inflatable structure for creating a peripheral barrier that can be placed easily around the vehicle and can be inflated, either with air or with a liquid that also serves to immerse the battery pack, can also easily be used.

Optionally, once the liner has been deployed under the wheels of the electric vehicle, the lifting cushion(s) may be deflated to bring the vehicle down to the ground with the liner inserted in between.

The invention claimed is:

1. A system for extinguishing a fire and/or preventing a fire from starting or restarting in an electric vehicle including a module or a battery pack comprising a plurality of electrochemical batteries, comprising:
    a self-supporting inflatable structure, the shape and dimensions of which when deployed are configured to lift the electric vehicle off a ground, create a liner between the ground and the electric vehicle, and create a peripheral barrier in continuity with the liner, which is closed upon itself, around the electric vehicle; and
    a liquid supply device configured to fill, at least partially, a sealed volume delimited inside the peripheral barrier and by the liner with a liquid, so as to immerse at least the module or battery pack in the liquid,
    wherein the self-supporting inflatable structure comprises at least one lifting cushion which deploys vertically under the vehicle as it inflates and a flexible strip extending from a bottom of the at least one cushion and deploying when it is inflated under the lifted electric vehicle toward a periphery thereof, so as to create the liner,
    the lifting cushion being configured to lift the vehicle when deployed so as to allow the flexible strip to deploy under the lifted electric vehicle.

2. The system according to claim 1, the inflatable structure comprising at least one filling hole for inflating at least a part of the structure adapted to lift the vehicle and a part configured to create the peripheral barrier.

3. The system according to claim 2, the filling hole being configured to be connected to the liquid supply device.

4. The system according to claim 1, the inflatable structure further comprising at least one flexible casing, which is closed upon itself, in a form of a sausage in continuity with the liner, and which deploys from the liner during inflation to create the peripheral barrier.

5. The system according to claim 4, the inflatable structure comprising a plurality of sausages, fluidly interconnected at a bottom thereof, and extending vertically when deployed.

6. The system according to claim 5, the vertical sausages being spaced apart regularly, so as to ensure uniform inflation and hence a uniform barrier around a whole periphery thereof.

7. The system according to claim 4, the inflatable structure comprising one or a plurality of annular sausages each extending along at least a horizontal circumference when they are deployed.

8. The system according to claim 7, the inflatable structure comprising a single annular sausage which is adapted, when the sealed volume is filled, to partially lift the liner so as to create the peripheral barrier together with the annular sausage.

9. The system according to claim 5, at least some of the sausages comprising an outlet hole at a top thereof, such that when the at least some of the sausages are deployed vertically, after being inflated with the liquid, the liquid fills, by overflowing from the at least some of the sausages, the sealed volume delimited inside the barrier and by the liner.

10. The system according to claim 1, the liquid for filling the sealed volume being water.

11. The system according to claim 10, comprising salts that are soluble in water, placed beforehand in at least one area of the structure in a non-deployed state so that the salts are in contact with the water when the sealed volume is filled.

12. The system according to claim 1, the inflatable structure being at least partially made of a fabric based on aramid fibers.

13. The system according to claim 12, the fabric being sealed, at least on an inside being configured to be in contact with the liquid, by a polytetrafluoroethylene (PTFE) film.

14. The system according to claim 1, the liquid supply device being one of a fire-fighting vehicle and an emergency response vehicle.

15. A method of operation of the system according to claim 5, comprising the following steps:
    i/positioning the inflatable structure under the electric vehicle;
    ii/inflating the at least one lifting cushion of the inflatable structure under the electric vehicle so as to lift the vehicle;
    iii/inflating a flexible strip of the inflatable structure so that it deploys under the lifted electric vehicle, toward a periphery of the lifted electric vehicle so as to create the liner;
    iv/once the liner has deployed, inflating the plurality of sausages of the inflatable structure so as to create the peripheral barrier around the electric vehicle; and
    v/filling, with the liquid from the supply device, at least part of the sealed volume delimited inside the peripheral barrier and by the liner, so as to immerse at least the module or battery pack.

16. The method according to claim 15, comprising steps ii/ to v/ being carried out one after the other using just the supply device, and step v/ being carried out by overflowing from sausages constituting the plurality of sausages of the structure once the sausages have been inflated.

17. The method according to claim 15, wherein step v/comprises filling using one of water and water containing salts.

18. The method according to claim 15, wherein steps iii/to v/are carried out by continuous inflation, using the liquid, of the flexible strip and plurality of sausages of the structure, which are fluidly interconnected.

19. The method according to claim 15, wherein steps iii/and iv/are carried out by continuous inflation, using air or another gas, of the flexible strip and plurality of sausages of the structure, which are fluidly interconnected.

\* \* \* \* \*